UNITED STATES PATENT OFFICE.

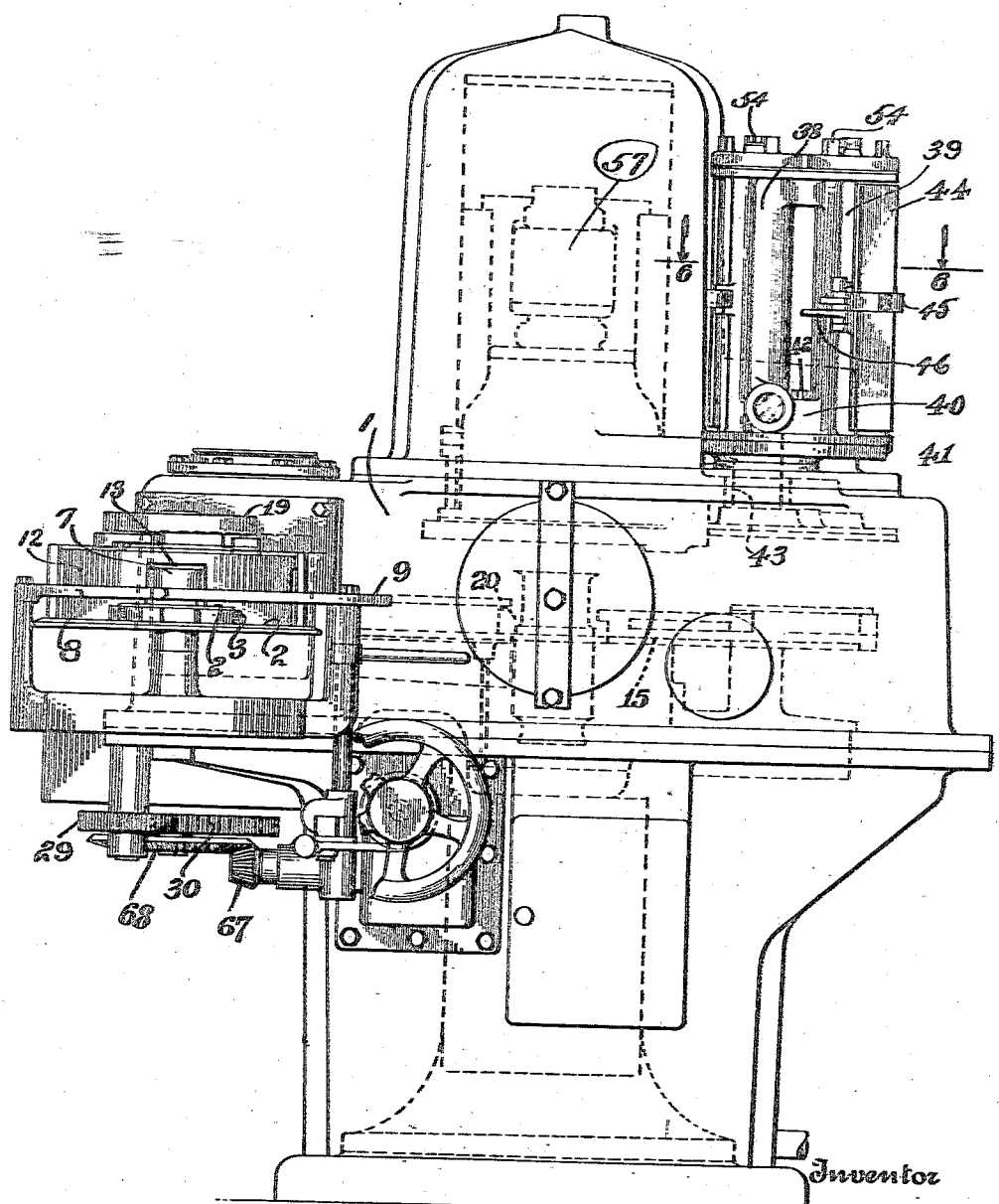

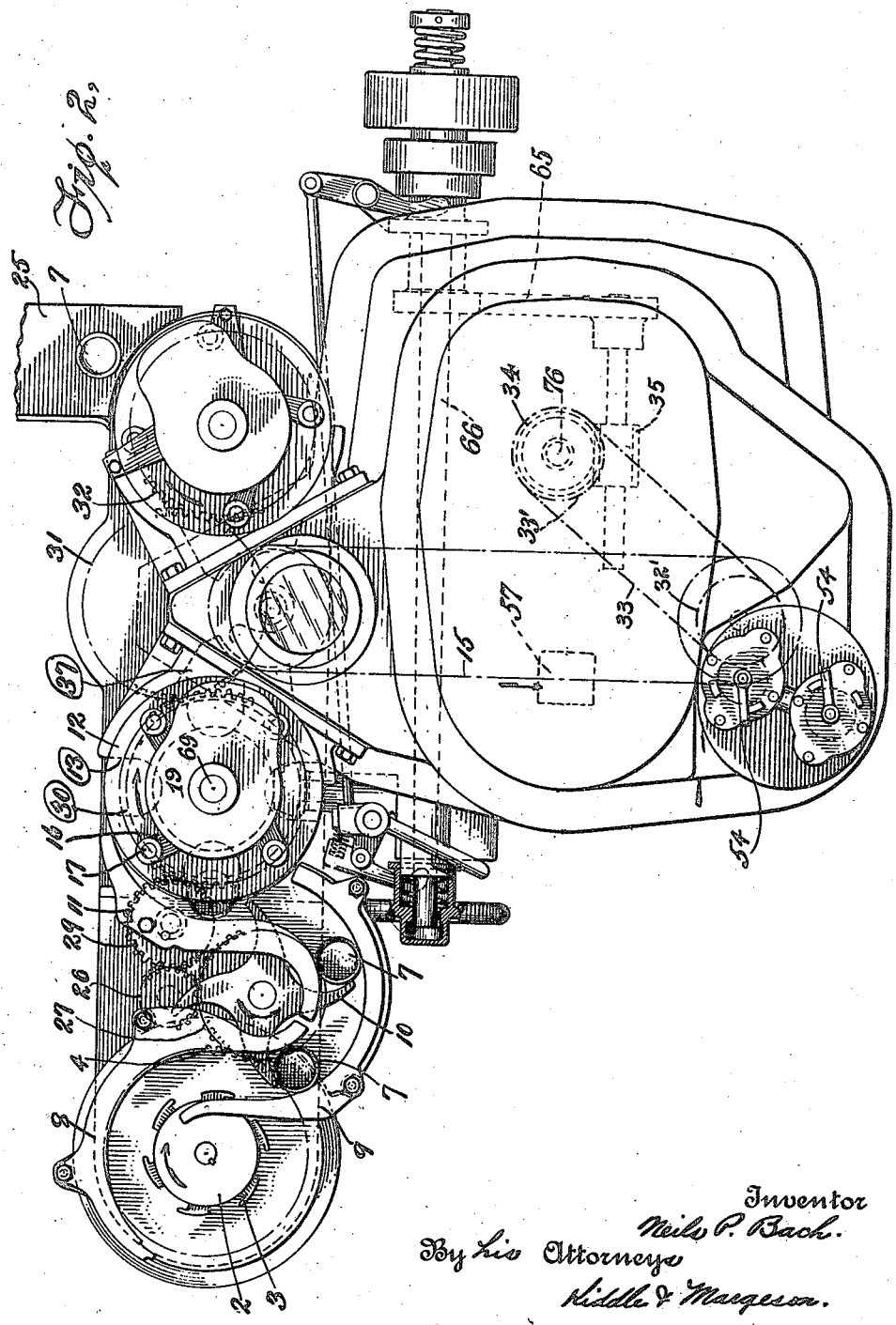

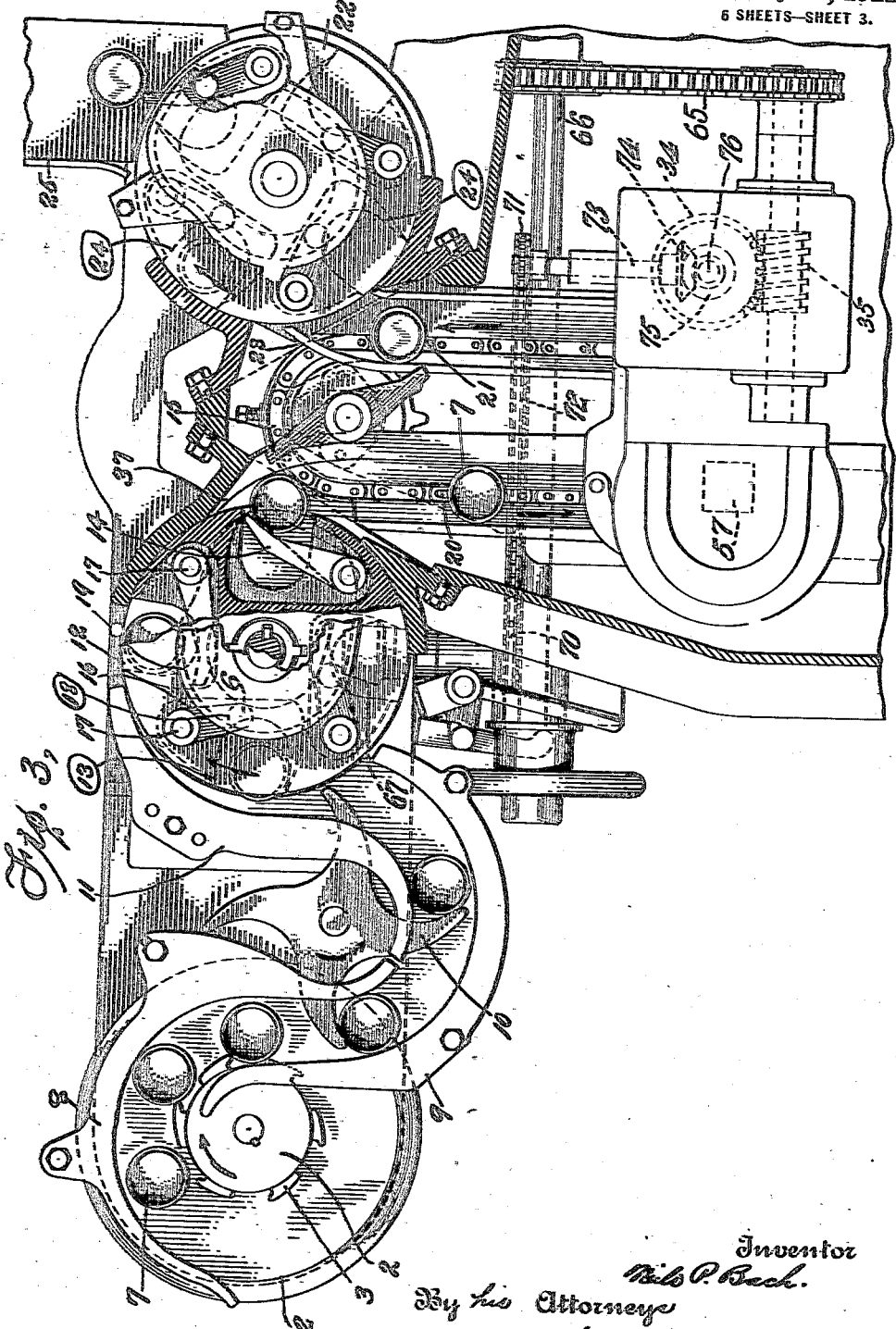

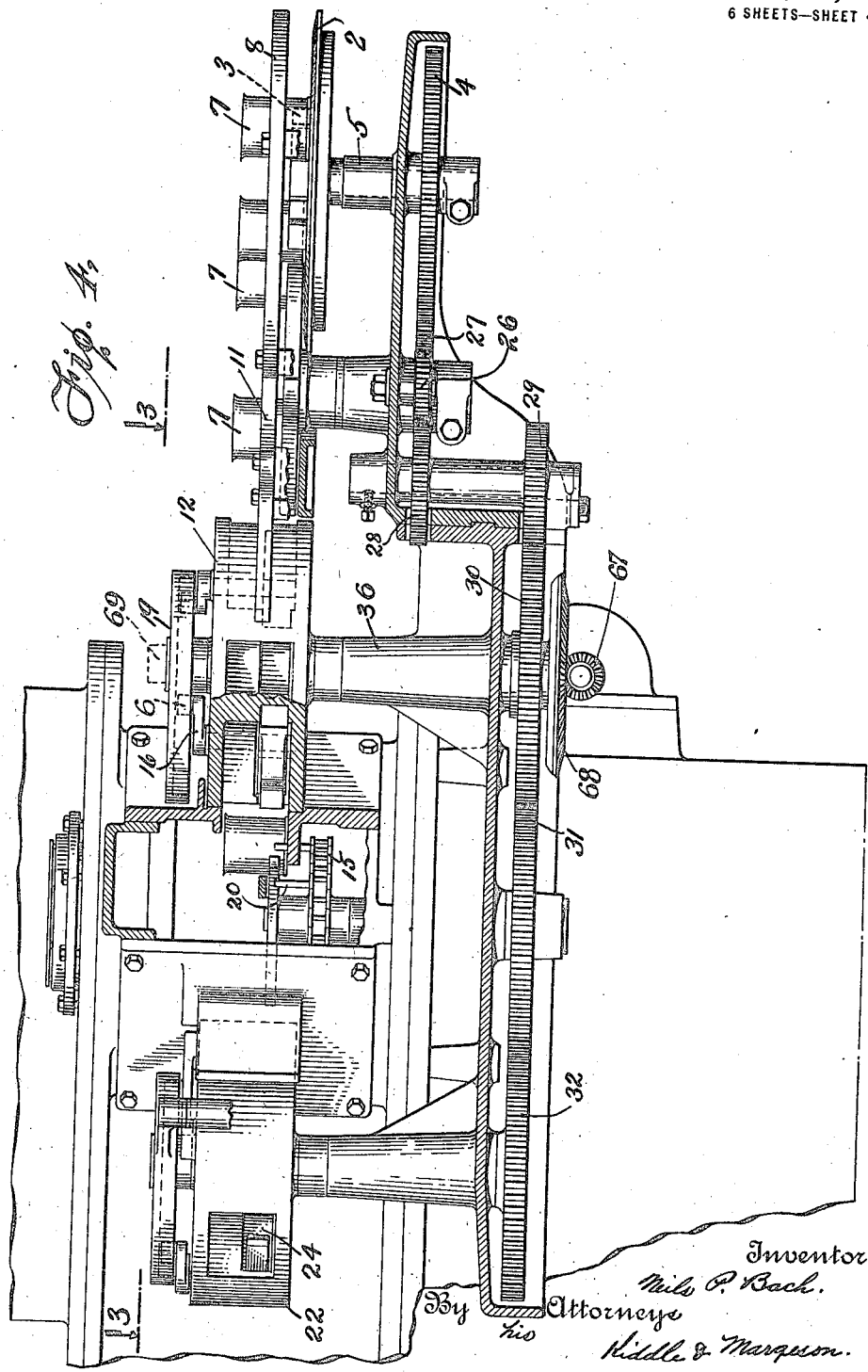

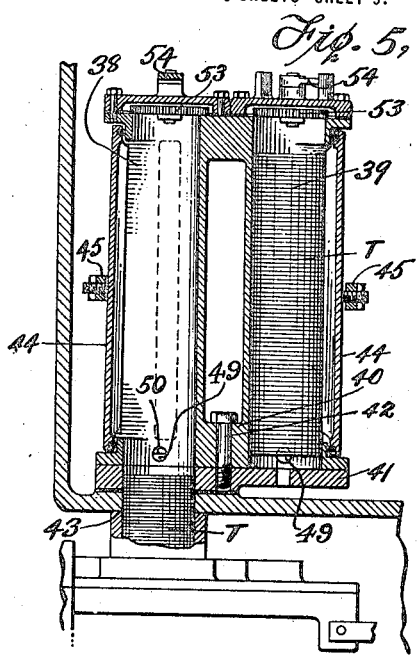

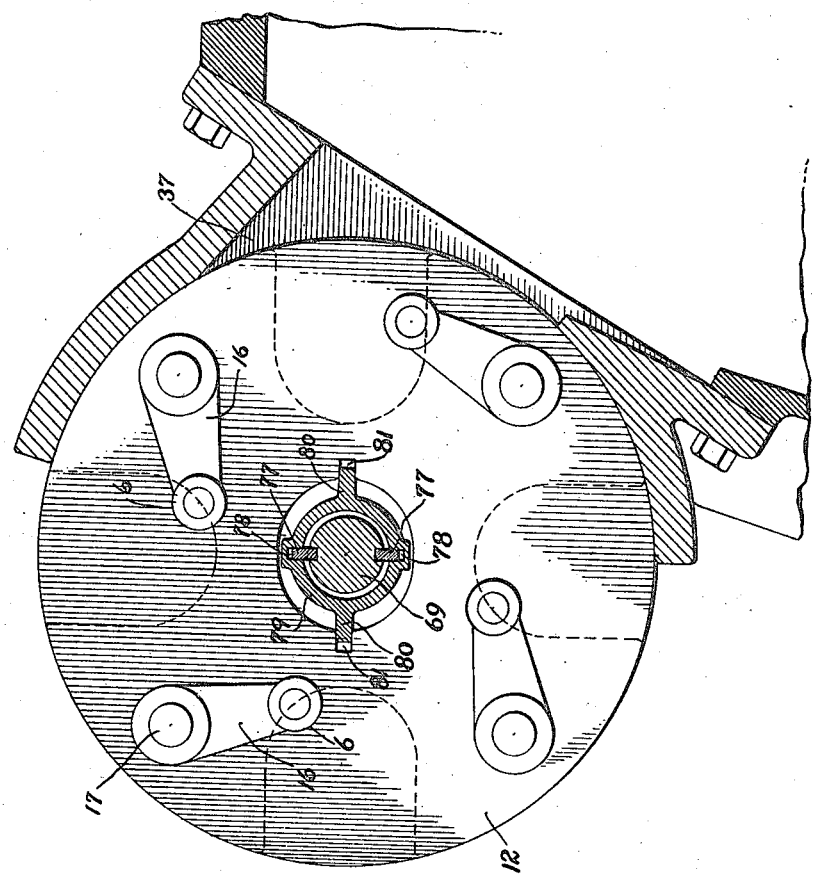

NEILS P. BACH, OF MILLBURN, NEW JERSEY, ASSIGNOR TO PERFECT VACUUM CANNING COMPANY, OF NEW YORK, N. Y., A CORPORATION OF MAINE.

APPARATUS FOR SEALING CONTAINERS.

1,423,591.　　　　　Specification of Letters Patent.　Patented July 25, 1922.

Application filed February 25, 1920. Serial No. 361,248.

*To all whom it may concern:*

Be it known that I, NEILS P. BACH, a subject of the King of Denmark, and a resident of Millburn, county of Essex, and State of New Jersey, have invented certain new and useful Improvements in Apparatus for Sealing Containers, of which the following is a specification.

My invention relates to an improved apparatus for sealing containers, and an object thereof is the provision of an apparatus embodying a vacuumizing chamber wherein the containers are sealed under vacuum, an improved valve mechanism being provided whereby the unsealed containers may be fed into the vacuumizing chamber and the sealed containers discharged therefrom without breaking the vacuum in the chamber.

In the accompanying drawings wherein an embodiment of my invention has been illustrated,—

Fig. 1 is an elevation of a machine embodying my invention;

Fig. 2 is a plan view showing the feed and discharge mechanism for feeding the containers to the vacuumizing chamber and discharging them therefrom;

Fig. 3 is a view similar to Fig. 2, some of the parts being broken away to show details of construction; this view being taken substantially on the line 3—3 of Fig. 4;

Fig. 4 is a view showing the feeding mechanism and the discharge mechanism in elevation with the driving mechanism therefor;

Fig. 5 is a sectional, elevational view of the magazines for the container tops, this figure being taken substantially on the line 5—5 of Fig. 6;

Fig. 6 is a plan view partially in section of the inlet valve mechanism.

Referring to the drawings in detail, 1 designates a vacuumizing chamber into which containers are fed by means of a feeding mechanism shown in plan in Figs. 2 and 3 and in elevation in Figs. 1 and 4. This feeding mechanism comprises a rotary disk 2 having container-engaging lugs 3, the disk being driven by a gear train shown in Fig. 4, and which will be hereinafter described in detail. I may mention, however, that the disk is driven by a gear 4 mounted at the base of a column 5 carrying the disk.

The containers designated 7 are placed upon the disk or table after filling and when the disk is rotated the container-engaging lugs 3 will engage the containers to advance them toward the vacuumizing chamber 1, the containers travelling on the table or disk between curved guides 8 and 9.

As each container reaches a position adjacent the forward end of the guide 8, it is engaged by a star wheel 10 rotating in synchronism with the disk or table 2 and which engages the moving container to advance the same toward the vacuumizing chamber guided now by the curved guides 9 and 11, the containers at this time having travelled out of contact with the guide 8. The star wheel advances the container toward the vacuumizing chamber until it reaches a rotary inlet valve 12 which inlet valve is provided with a series of pockets designated 13 for the reception of the containers, this valve rotating in synchronism with the star wheel and the disk or table 2, the pockets 13 being disposed in the periphery of the valve in such a manner as to bring a pocket in position to receive a container as the latter is moved up to the periphery of the valve by rotation of the star wheel 10.

The rotary inlet valve 12, it will be noticed, is set into a port 37 in the wall of the vacuumizing chamber, the port conforming to the cylindrical periphery of the valve.

The containers riding in the pockets 13 are carried by the rotating inlet valve until the latter reaches the position shown in Fig. 3 at which time a finger 14 carried by the valve engages the container and transfers the same to a chain 15 within the vacuumizing chamber. The finger 14 may be operated by any suitable mechanism to cause the finger to move from the full-line position of Fig. 3 to the dotted-line position of said figure to effect the mentioned transfer of the container. In the present instance the fingers are operated through the medium of lever arms 16 mounted on the shafts 17 which carry the fingers, the upper end of these lever arms, as shown in Fig. 4, carrying a roller 6 which is adapted to engage a cam slot 18 provided in the plate 19 above the intake valve.

The chain 15 already mentioned, upon which the containers are transferred from the inlet valve 12 by the fingers 14 carries suitably spaced container-engaging lugs 20 which lugs engage the containers, and inasmuch as the chain 15 is constantly travelling, the containers will be advanced thereby to a sealing station 57 within the vacuumizing chamber, this sealing station being shown diagrammatically in Figs. 1, 2 and 3.

The feeding mechanism, that is to say the disk 2, star wheel 10 and the inlet valve 12, are driven through the medium of a gear train (shown in Fig. 4), this gear train comprising spur gears 4, 26, 27, 28, 29, 30, 31 and 32, the gears 30 and 32 driving the inlet valve and discharge valve, respectively. The chain 15 is driven through the medium of a sprocket 32′, chain 33, a sprocket 33′ and a worm wheel and worm 34 and 35, respectively, the latter in turn being driven by a sprocket chain 65 which in turn is driven from a drive shaft 66 driven by any suitable motor. The gears 4, 26, 27, 28, 29, 30, 31 and 32 already referred to are also driven from the drive shaft 66, through the medium of a bevel gear 67 meshing with the gear 68 on a shaft 69 which shaft carries the gear on which is mounted the inlet valve 12 and which shaft likewise carries the gear 30. The gear 67 is operatively connected to the drive shaft through sprockets 70 and 71 connected by a chain 72, the sprocket 71 being mounted upon a shaft 73 carrying a bevel gear 74 meshing with a bevel gear 75 upon the shaft 76 carrying the gear 34 already referred to. The gear train for driving the feed mechanism and the chain 15 are so proportioned that the container, from the time it is placed on the table 2, is conveyed in a smooth, continuous motion up to the time the containers are sealed in order that the containers may be filled and fed into the vacuumizing chamber before the tops are applied, it being well known that in present practice the tops are applied to the containers before the same are fed to the vacuumizing chamber.

The advantage of my arrangement over prior practice is obvious inasmuch as by my method and apparatus thorough and complete exhaustion of the air in the containers is insured before the tops are applied.

The inlet valve 12 is of novel construction in that it is mounted on its supporting element 36 in such a manner as to enable the valve to have a slight movement radially relatively to said supporting member. This construction is shown in detail in Fig. 10. It will be seen that the shaft 69 is provided with keys 77 received by key ways 78 in a bushing 79 surrounding said shaft and which bushing in turn is provided with keys 80 received by key ways 81 in the body of the valve itself. The bushing 79 is loosely mounted on the shaft 69, there being considerable play between the bushing and said shaft. Likewise, there is considerable play between the keys 80 and the key ways 81 so that the valve in effect floats with respect to the shaft 69 and has movement radially relatively thereto. In such an arrangement, there being a vacuum within the chamber 1, the inlet valve 12 will always be held against its seat in the port 37 by atmospheric pressure and any wear due to the rotation of the valve will be taken up automatically by the radial movement of the valve relatively to its supporting member 69 under atmospheric pressure.

Inasmuch as the tops are applied after the containers have been fed into the vacuumizing chamber and while the containers are being subjected to a vacuum, it becomes desirable to provide means whereby the supply of container tops may be replenished without breaking this vacuum. The apparatus for this purpose is shown in detail in Fig. 5. An inspection of these drawings will show that I have provided two magazines 38 and 39, respectively, each of which is adapted to contain a supply of container tops T. But one magazine is adapted to feed the tops to the containers at a time, the magazines being so disposed relatively to each other and to the vacuumizing chamber that when the magazine 38, for example, is supplying tops to the containers the magazine 39 is available for re-loading. The magazines are carried in a frame 40 secured to the side of the vacuumizing chamber in any suitable manner but here shown mounted upon a plate 41, being held in place thereon by a bolt or stud 42 about which the magazines as a whole are adapted to be rotated. A port 43 is provided in the vacuum chamber, this port being positioned so that the containers in their passage through the vacuum chamber pass directly beneath the same. The lower end of each magazine is open and designed to register with the port 43 when the magazines are rotated into proper position about the stud 42. In the position shown in Fig. 5 the magazine 38 is in position to bring the lower end of the magazine in register with the port 43 in order that the container tops may be discharged from the magazine to containers within the vacuumizing chamber.

The tops are retained in each magazine by means of short studs 49 adapted to be reciprocated transversely of the magazine, a pair of these studs being provided for each magazine. The ends of these studs adjacent the inside of the magazine are provided with lips 50 upon which the container tops are adapted to rest. Simultaneous reciprocation of these studs out of retaining position is obtained through the medium of a pair of vertically extending rods, the upper ends of each rod carrying a small gear meshing with a gear 53 at the top of the magazine which gear is adapted to be rotated by a handle 54, accessible from the exterior of the magazine.

It will be seen that by reason of the particular type of sealing mechanism employed including the apparatus for conveying the container tops to the sealing station and by reason of the cooperation of the chain 15 with the sealing mechanism that the movement of the containers from the time they are placed upon the table 2 and until they are sealed, is a continuous one. This enables me to fill the containers before they are fed into the vacuumizing chamber without danger of the contents of the containers being spilled during the transfer of the containers from the chain 15 to the sealing station.

From the foregoing it will be seen that the containers after being filled and without the tops in place thereon, may be fed continuously into the vacuumizing chamber, being discharged into the vacuumizing chamber from the inlet valve 12 by the fingers 14 which also transfer the containers to the chain 15, the containers being carried by this chain to position beneath the sealing station 57 where, as already described, the tops are applied, the containers lifted from the chain 15 and sealed, after which they are transferred to the chain 15 and finally discharged from the machine. The containers, throughout their travel move continuously up to the time they are lifted from the chain 15 and may therefore be filled before entering the vacuumizing chamber and fed into the same without the tops in place, without danger of spilling their contents. It will be observed that the containers from the moment they enter the vacuumizing chamber until they are discharged from the discharge valve 22, are subjected to a vacuum.

It will be obvious also from the foregoing that the time that the containers are subjected to a vacuum may be varied by slowing up the driving mechanism or by increasing the length of the chain 15 so that the distance from the point of entry of the containers to the vacuum chamber to the sealing station may be increased.

What I claim as new is:

In apparatus of the class described, the combination of a vacuumizing chamber, a port therein, a rotary inlet valve controlling said port, a seat for said valve, a shaft carrying said valve, said valve having movement radially of said shaft and held to its seat in the port by atmospheric pressure.

This specification signed this 20th day of February, 1920.

NEILS P. BACH.